(12) United States Patent
Choi et al.

(10) Patent No.: US 9,043,030 B2
(45) Date of Patent: May 26, 2015

(54) MANIPULATOR AND PATH GENERATION METHOD THEREOF

(75) Inventors: Jong Do Choi, Suwon-si (KR); Kyung Shik Roh, Seongnam-si (KR); Young Bo Shim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 157 days.

(21) Appl. No.: 13/492,993

(22) Filed: Jun. 11, 2012

(65) Prior Publication Data

US 2013/0013113 A1   Jan. 10, 2013

(30) Foreign Application Priority Data

Jul. 6, 2011   (KR) .................. 10-2011-0067069

(51) Int. Cl.
*G05B 15/00*   (2006.01)

(52) U.S. Cl.
CPC .............. *G05B 15/00* (2013.01); *Y10S 901/01* (2013.01); *Y10S 901/02* (2013.01); *Y10S 901/46* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,835,710 A * | 5/1989 | Schnelle et al. | ............ | 700/262 |
| 5,159,249 A * | 10/1992 | Megherbi | ............ | 318/568.1 |
| 5,511,147 A * | 4/1996 | Abdel-Malek | ............ | 700/264 |
| 5,544,282 A * | 8/1996 | Chen et al. | ............ | 700/255 |
| 5,590,244 A * | 12/1996 | Nakata et al. | ............ | 700/260 |
| 6,004,016 A * | 12/1999 | Spector | ............ | 700/56 |
| 6,216,058 B1 * | 4/2001 | Hosek et al. | ............ | 700/245 |
| 6,408,224 B1 * | 6/2002 | Okamoto et al. | ............ | 700/245 |
| 6,456,897 B1 * | 9/2002 | Papiernik et al. | ............ | 700/194 |
| 6,643,563 B2 * | 11/2003 | Hosek et al. | ............ | 700/245 |
| 7,130,716 B2 * | 10/2006 | Rogers et al. | ............ | 700/218 |
| 7,146,242 B2 * | 12/2006 | Weinhofer | ............ | 700/189 |
| 7,786,404 B2 * | 8/2010 | Menin et al. | ............ | 219/121.63 |
| 7,927,062 B2 * | 4/2011 | Rice et al. | ............ | 414/806 |
| 8,473,096 B2 * | 6/2013 | Matsuo et al. | ............ | 700/229 |
| 8,509,951 B2 * | 8/2013 | Gienger | ............ | 700/263 |
| 8,838,273 B2 * | 9/2014 | Hvass et al. | ............ | 700/253 |
| 2004/0093119 A1 * | 5/2004 | Gunnarsson et al. | ............ | 700/245 |
| 2004/0249509 A1 * | 12/2004 | Rogers et al. | ............ | 700/245 |
| 2005/0067995 A1 * | 3/2005 | Weinhofer et al. | ............ | 318/574 |
| 2006/0293790 A1 * | 12/2006 | Gienger | ............ | 700/245 |
| 2010/0138039 A1 * | 6/2010 | Moon et al. | ............ | 700/245 |
| 2010/0312391 A1 * | 12/2010 | Choi et al. | ............ | 700/254 |
| 2011/0106307 A1 * | 5/2011 | Kim et al. | ............ | 700/246 |

* cited by examiner

*Primary Examiner* — Jonathan L Sample
(74) *Attorney, Agent, or Firm* — Harness, Dickey & Pierce, P.L.C.

(57) ABSTRACT

A manipulator and a method of generating the shortest path along which the manipulator moves to grip an object without collision with the object models a target object and a gripper into a spherical shape, measures a current position of the gripper and a position of the target object and a target position of the gripper, calculates an arc-shaped path in a two-dimensional plane along which the gripper needs to move by calculating an included angle of a triangle consisting of the position of the object and the current position and target position of the gripper, transforms the arc-shaped path in the two-dimensional plane into an arc-shaped path in a three-dimensional space using a transform matrix consisting of the position of the object and the current position and target position of the gripper, thereby automatically generating the shortest path of the manipulator.

20 Claims, 9 Drawing Sheets

FIG. 9

MANIPULATOR AND PATH GENERATION METHOD THEREOF

CROSS-REFERENCE TO RELATED APPLICATIONS

This application claims the benefit of Korean Patent Application No. 2011-0067069, filed on Jul. 6, 2011 in the Korean Intellectual Property Office, the disclosure of which is incorporated herein by reference.

BACKGROUND

1. Field

Embodiments relate to a method of generating the shortest path along which a robot manipulator may move to grip an object without collision with the object.

2. Description of the Related Art

In general, machines which execute motions similar to those of humans using an electric or magnetic action are referred to as robots. Industrial robots, such as manipulators and transfer robots for automation and unmanned operation of production fields, which execute dangerous operations, repeated operations, and operations requiring strong force in place of humans were the first to be introduced. Recently, vigorous development of humanoid robots which have a joint system similar to that of humans and coexist with humans in human working and living spaces to supply various services to humans is underway.

Such a humanoid robot executes an operation using a manipulator produced to move similar to the motion of a human arm or hand through an electrical and mechanical mechanism. Most manipulators which are used now are formed by connecting a plurality of links. A connection portion between the respective links is referred to as a joint, and motion characteristics of a manipulator are determined by geometrical relations between the links and the joints. Mathematical expression of these relations is referred to as kinematics, and most manipulators having kinematic characteristics move a robot front end (hereinafter, referred to as a gripper) to a position at which an operation is executed.

In order to allow a manipulator to execute a given operation (for example, an operation of gripping an object), generation of a movement path of the manipulator from a current position (start point) prior to executing the operation to a position at which the operation is executed, i.e., a target position (target point) to grip the object, is required. At this time, the trajectory of the shortest path along which the manipulator may move from the current position to the target position without collision with the object needs to be generated.

SUMMARY

Therefore, it is an aspect to provide a method of generating the shortest path along which a robot manipulator may move to a target position without collision with an object during a process of gripping the object in real time.

Additional aspects will be set forth in part in the description which follows and, in part, will be obvious from the description, or may be learned by practice of the invention.

In accordance with one aspect, a movement path generation method of a manipulator to grip an object may include recognizing a current position of a gripper provided at the front end of the manipulator, a position of the object and a target position of the gripper, calculating a rotary angle in a plane from the current position of the gripper, the position of the object and the target position of the gripper, calculating an arc-shaped path in a two-dimensional plane along which the gripper needs to move using the calculated rotary angle, calculating a transform matrix consisting of the current position of the gripper, the position of the object and the target position of the gripper, and transforming the arc-shaped path in the two-dimensional plane into an arc-shaped path in a three-dimensional space using the transform matrix.

The current position of the gripper may be a position of a start point of the gripper prior to executing an operation of gripping the object.

The position of the object may be a central position of the object to be gripped.

The target position of the gripper may be a position of a target point of the gripper to grip the object.

The calculation of the rotary angle in the plane may include calculating an included angle of a triangle formed by connecting the current position of the gripper, the position of the object and the target position of the gripper.

The calculation of the arc-shaped path in the two-dimensional space may include calculating the sum of a radius of the object and a radius of the gripper, calculating an included angle by which the gripper moves for a designated time, and calculating x and y coordinates in the two-dimensional plane to generate an arc-shaped trajectory by multiplying the sum of the radius of the object and the radius of the gripper by the included angle by which the gripper moves for the designated time.

The calculation of the transform matrix may include transforming a triangular plane generating the arc-shaped trajectory from the current position of the gripper, the position of the object and the target position of the gripper into a three-dimensional matrix.

The transformation of the arc-shaped path in the two-dimensional plane into the arc-shaped path in the three-dimensional space may include generating the arc-shaped path in the three-dimensional space along which the gripper needs to move by multiplying the three-dimensional matrix by the x and y coordinates in the two-dimensional plane.

In accordance with another aspect of the present invention, a manipulator may include a gripper to grip an object, a plurality of links to move the gripper to a target position to grip the object, a recognition unit to recognize a current position of the gripper, a position of the object and a target position of the gripper, and a path generation unit to calculate an arc-shaped path in a two-dimensional plane along which the gripper needs to move using the current position of the gripper, the position of the object and the target position of the gripper, and to generate an arc-shaped path in a three-dimensional space along which the gripper needs to move using the calculated arc-shaped path in the two-dimensional plane.

The path generation unit may include a two-dimensional path calculation unit to calculate the arc-shaped path in the two-dimensional plane using the current position of the gripper, the position of the object and the target position of the gripper, and a three-dimensional path transform unit to transform the arc-shaped path in the two-dimensional plane into the arc-shaped path in the three-dimensional space by calculating a transform matrix consisting of the current position of the gripper, the position of the object and the target position of the gripper.

The two-dimensional path calculation unit may calculate a rotary angle in a plane from the current position of the gripper, the position of the object and the target position of the gripper, and calculate the arc-shaped path in the two-dimensional plane along which the gripper needs to move using the calculated rotary angle.

The two-dimensional path calculation unit may calculate the sum of a radius of the object and a radius of the gripper, calculate an included angle by which the gripper moves for a designated time, and calculate x and y coordinates in the two-dimensional plane to generate an arc-shaped trajectory by multiplying the sum of the radius of the object and the radius of the gripper by the included angle by which the gripper moves for the designated time.

The three-dimensional path transform unit may transform a triangular plane generating the arc-shaped trajectory from the current position of the gripper, the position of the object and the target position of the gripper into a three-dimensional matrix, and generate the arc-shaped path in the three-dimensional space along which the gripper needs to move by multiplying the three-dimensional matrix by the x and y coordinates in the two-dimensional plane.

The manipulator may further include joints to drive the plurality of links to move the gripper along the path generated by the path generation unit.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to like elements throughout.

Figure 1:
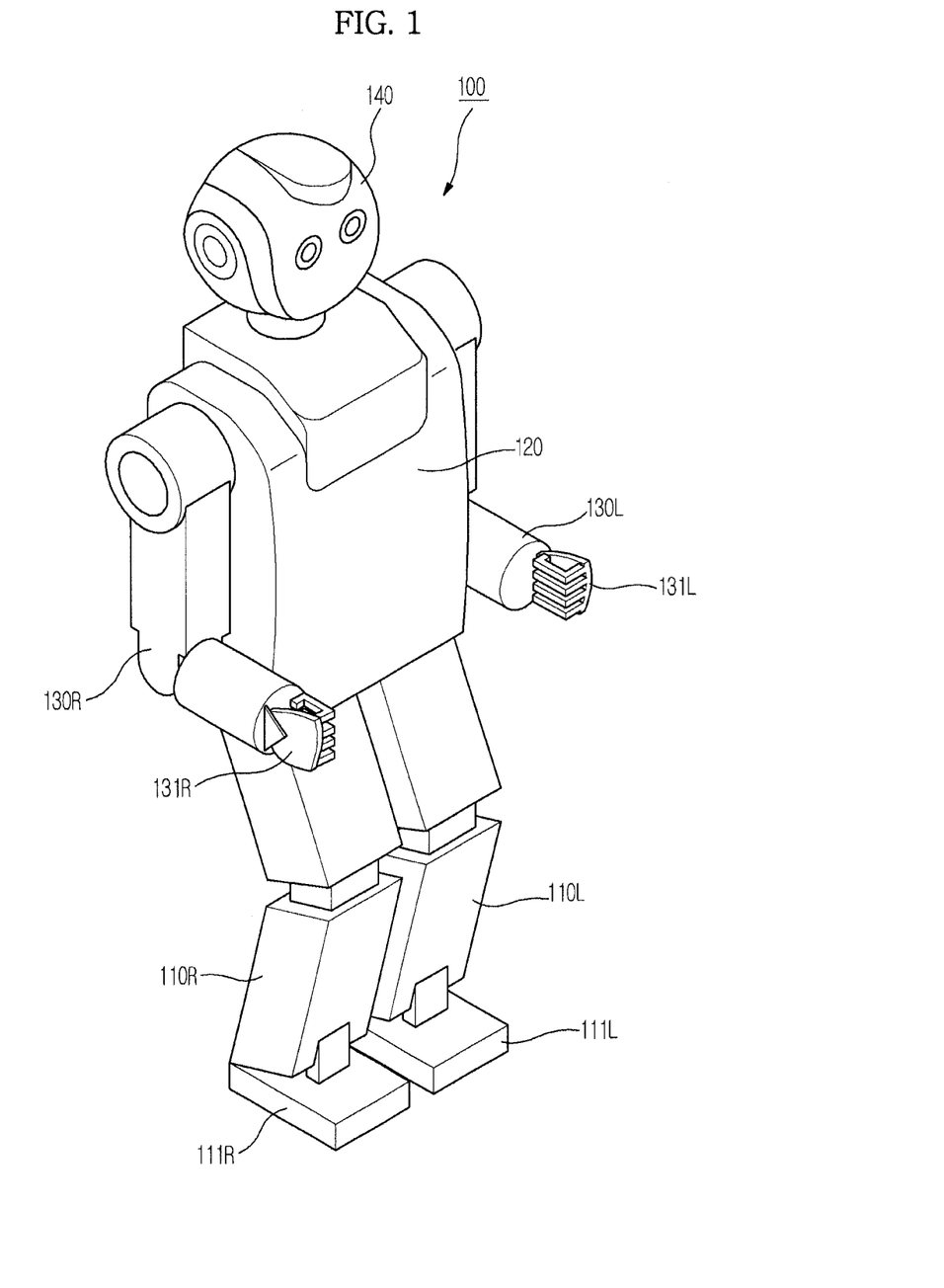
FIG. 1 is a view illustrating the external appearance of a robot in accordance with one embodiment.

FIG. 1 is a view illustrating the external appearance of a robot in accordance with one embodiment.

As shown in FIG. 1, a robot 100 in accordance with one embodiment may be a bipedal walking robot which may move erect with two legs 110R and 110L in the same manner as a human, and may include a torso 120, two arms 130R and 130L and a head 140 provided at the upper portion of the torso 120, feet 111R and 111L provided at the front ends of the two legs 110R and 110L and hands 131R and 131L provided at the front ends of the two arms 130R and 130L.

Here, R and L respectively indicate the right and left sides of the robot 100.

Figure 2:
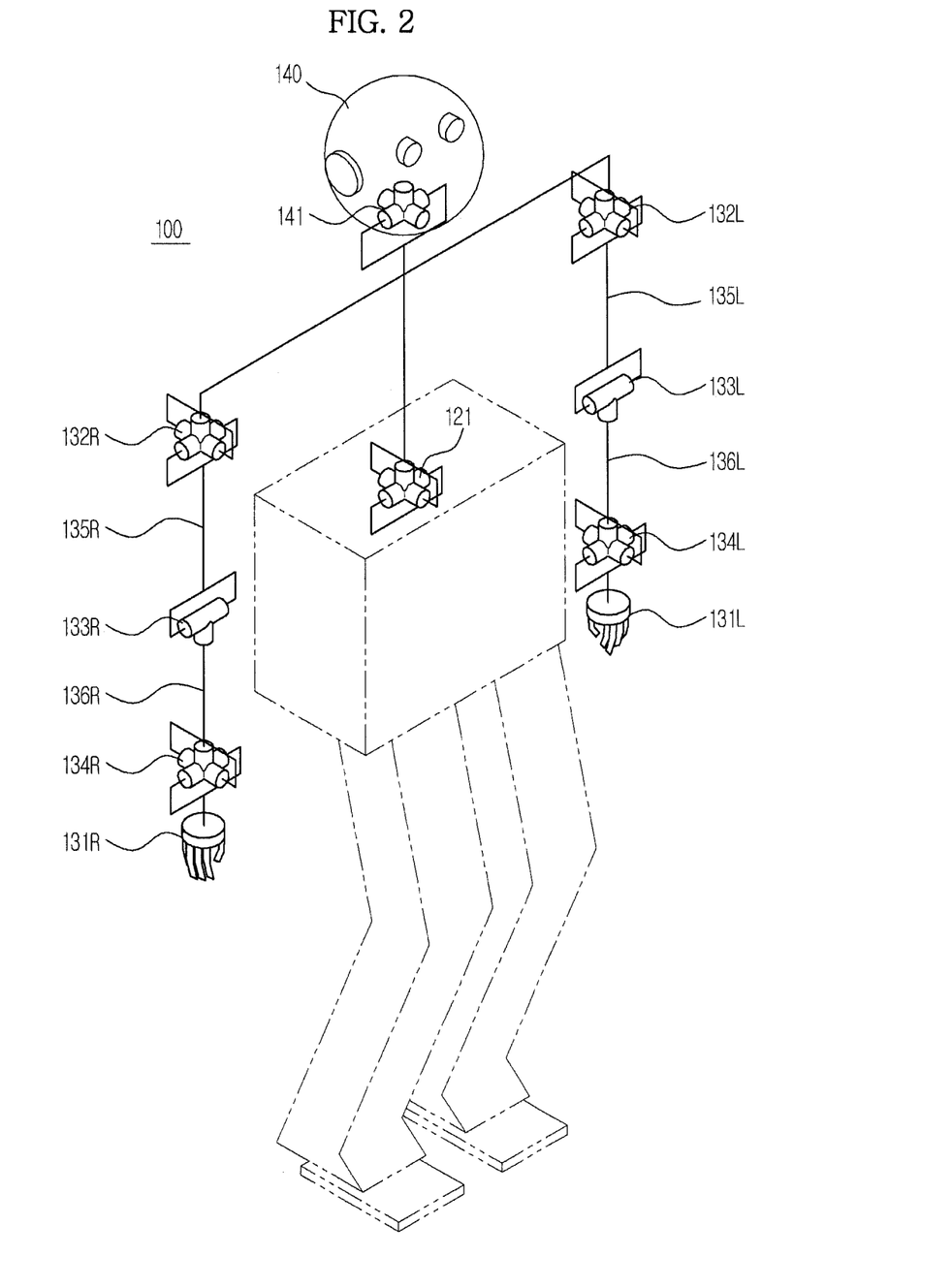
FIG. 2 is a view illustrating main joint structures of the robot shown in FIG. 1.

FIG. 2 is a view illustrating main joint structures of the robot shown in FIG. 1.

As shown in FIG. 2, the two arms 130R and 130L respectively may include shoulder joints 132R and 132L, elbow joints 133R and 133L, and wrist joints 134R and 134L so that portions of the robot 100 corresponding to shoulders, elbows and wrists of a human may be rotatable, and the shoulder joints 132R and 132L may be located at both ends of the upper portion of the torso 120.

The shoulder joints 132R and 132L of the respective arms 130R and 130L may be movable in the x axis direction (in the roll axis direction), in the y axis direction (in the pitch axis direction) and the z axis direction (in the yaw axis direction), the elbow joints 133R and 133L may be movable in the y axis direction (in the pitch axis direction), and the wrist joints 134R and 134L may be movable in the x axis direction (in the roll axis direction), in the y axis direction (in the pitch axis direction) and the z axis direction (in the yaw axis direction).

The two arms 130R and 130L may further include upper links 135R and 135L connecting the shoulder joints 132R and 132L and the elbow joints 133R and 133L to each other, and lower links 136R and 136L connecting the elbow joints 133R and 133L and the wrist joints 134R and 134L to each other, thereby possibly moving with designated degrees of freedom according to movable angles of the respective joints 132R, 132L, 133R, 133L, 134R and 134L.

A waist joint 121 allowing a portion of the robot 100 corresponding to a waist of a human to be rotatable may be provided on the torso 120 connected to the two legs 110R and 110L, and a neck joint 141 allowing a portion of the robot 100 corresponding to a neck of a human to be rotatable may be provided on the head 140 connected to the torso 120.

In one embodiment, each of the two arms 130R and 130L may correspond to a manipulator 130 executing an operation through which a motion may be achieved, and the hand 131R or 131L provided at the front end of the manipulator 130 may correspond to a gripper 131 to grip a target object. This will be described in brief with reference to FIGS. 3(a) and 3(b).

Figure 3:
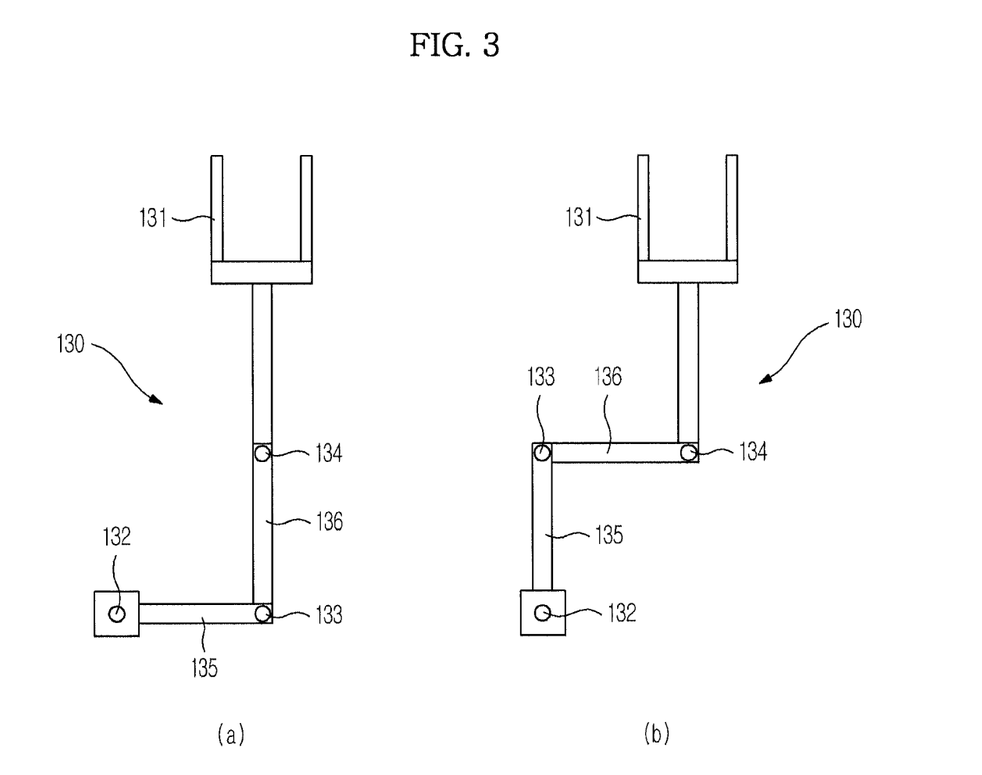
FIGS. 3(a) and 3(b) are views schematically illustrating the shape of a kinematically redundant manipulator of the robot in accordance with one embodiment.

FIGS. 3(a) and 3(b) are views schematically illustrating the shape of the kinematically redundant manipulator of the robot in accordance with one embodiment.

As shown in FIGS. 3(a) and 3(b), the manipulator 130 may be configured to move in a similar manner to a human arm or hand by an electrical and mechanical mechanism, and may be formed by connecting a plurality of links (in more detail, upper and lower links) 135 and 136 through a plurality of joints (in more detail, shoulder joints, elbow joints and wrist joints) 132, 133 and 134. Motion characteristics of the manipulator 130 may be determined by geometrical relations between the links 135 and 136 and the joints 132, 133 and 134. Mathematical expression of these relations is referred to as kinematics, and most manipulators having kinematic characteristics may move a gripper to a position to perform an operation. The manipulator 130 in accordance with one embodiment may move the gripper 131 to a target position to grip an object using the links 135 and 136, the positions and directions of which are adjustable.

As shown in FIGS. 3(a) and 3(b), the shape of the manipulator 130 moving to the target position to grip the same object may be varied.

Figure 4:
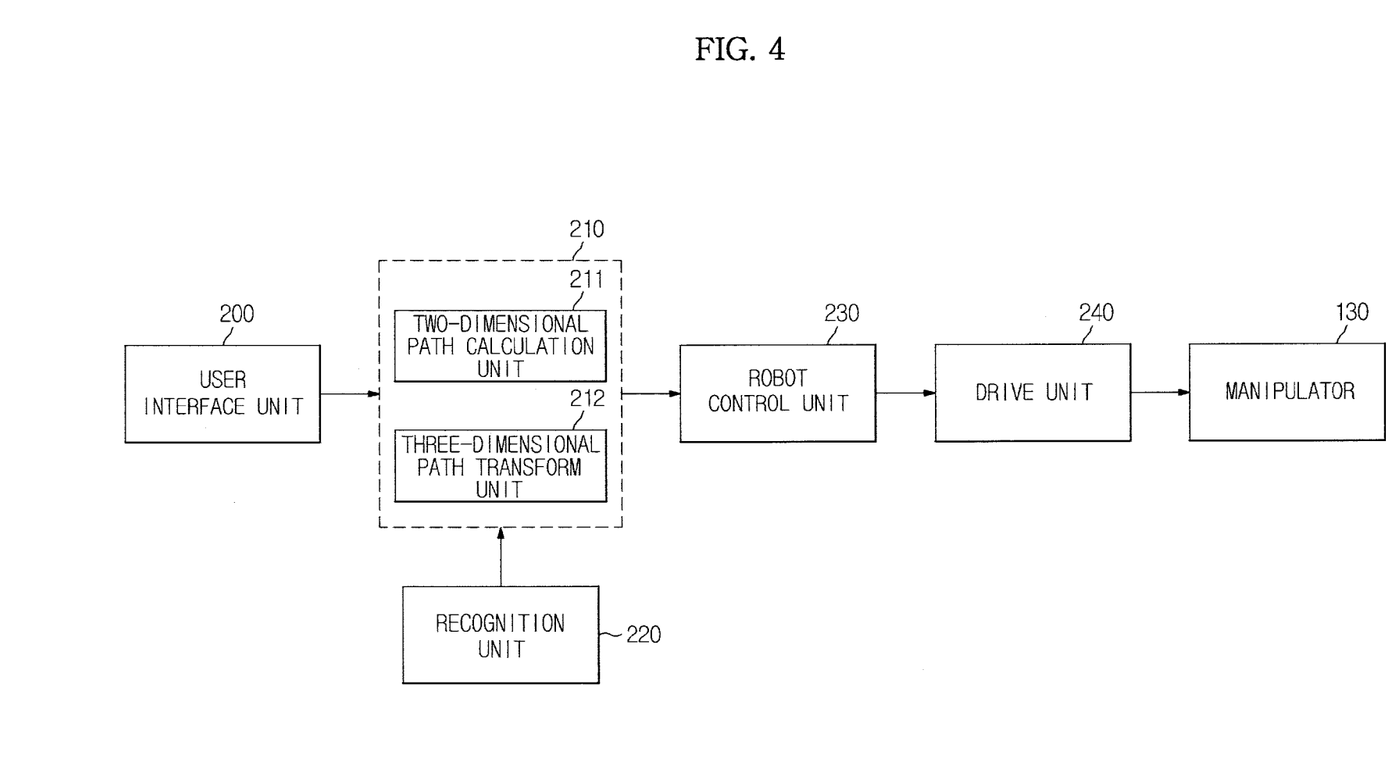
FIG. 4 is a block diagram illustrating a control system of a movement path of a gripper of the manipulator of the robot in accordance with one embodiment.

FIG. 4 is a block diagram illustrating a control system of a movement path of the gripper of the manipulator of the robot in accordance with one embodiment, possibly including a user interface unit 200, a path generation unit 210, a recognition unit 220, a robot control unit 230, and a drive unit 240.

The user interface unit 200 may enable a user to input an operation command performed by the manipulator 130, particularly, the gripper 131 (for example, a command to grip an object placed on a table) through operation of a switch or voice.

The path generation unit 210 may generate an operation path to control movement of the gripper 131 to grip a target object A without collision with the target object A according to the operation command input through the user interface unit 200, and may transmit the operation path to the robot control unit 230.

Further, the path generation unit 210 may include a two-dimensional path calculation unit 211 to calculate an arc-shaped path in a two-dimensional plane along which the gripper 131 moves using a position of the object A, a current position of the gripper 131 and a target position of the gripper 131, and a three-dimensional path transform unit 212 to transform the arc-shaped path in the two-dimensional plane into an arc-shaped path in a three-dimensional space along which the grippers 131 moves by calculating a transform matrix consisting of the position of the target object A, the current position of the gripper 131 and the target position of the gripper 131.

The recognition unit 220 may recognize information given for the gripper to execute the operation command, for example, the shape of the gripper 131 at the current position (start point) prior to executing the operation command, the shape of the gripper 131 at the target position (target point) to execute the operation command and the position of the target object A to be gripped, and may transmit the recognized information to the path generation unit 201. Such recognized information may be used to generate the movement path of the gripper 131 by the path generation unit 210.

A method of recognizing the position of the target object A and the current position and the target position of the gripper 131 through the recognition unit 220 will be described later with reference to FIG. 5.

The robot control unit 230 may control the drive unit 240 according to the movement path transmitted from the path generation unit 210 to drive the manipulator 130, thereby controlling movement of the gripper 131 provided at the front end of the manipulator 130.

Hereinafter, an operating process and functions and effects of the above-described robot manipulator and a path generation method thereof will be described.

Figure 5:
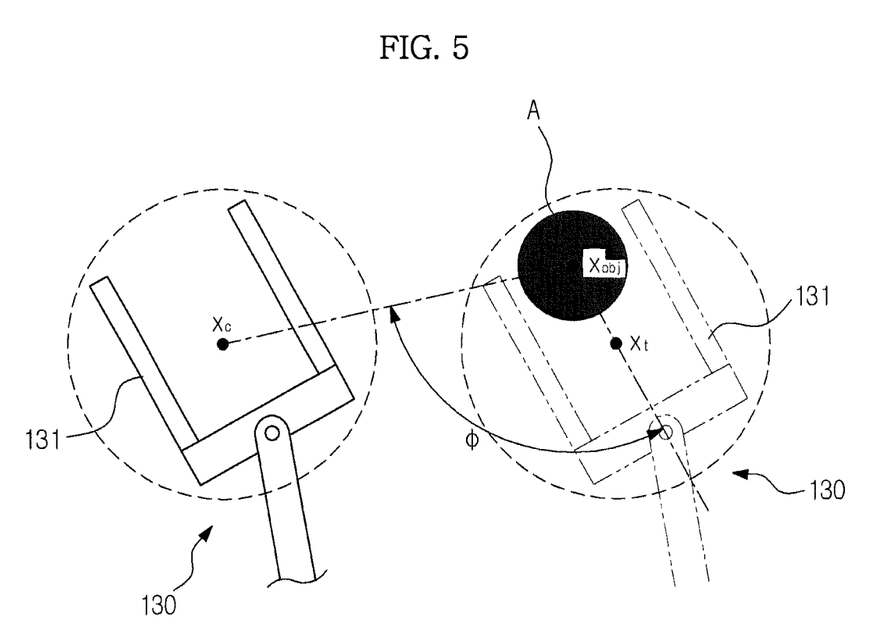
FIG. 5 is a view illustrating modeling of gripping of an object through the gripper in accordance with one embodiment.
Figure 6:
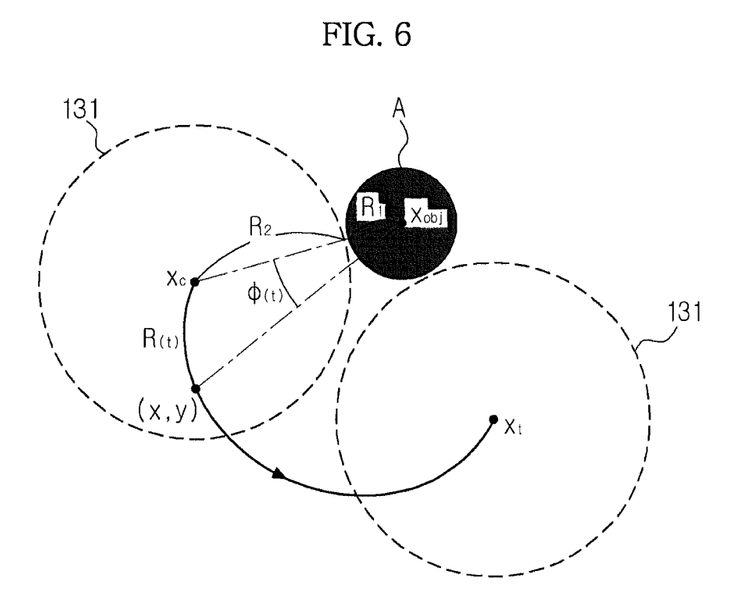
FIG. 6 is a view illustrating an arc-shaped path in a two-dimensional plane along which the gripper in accordance with one embodiment moves to grip an object.
Figure 7:
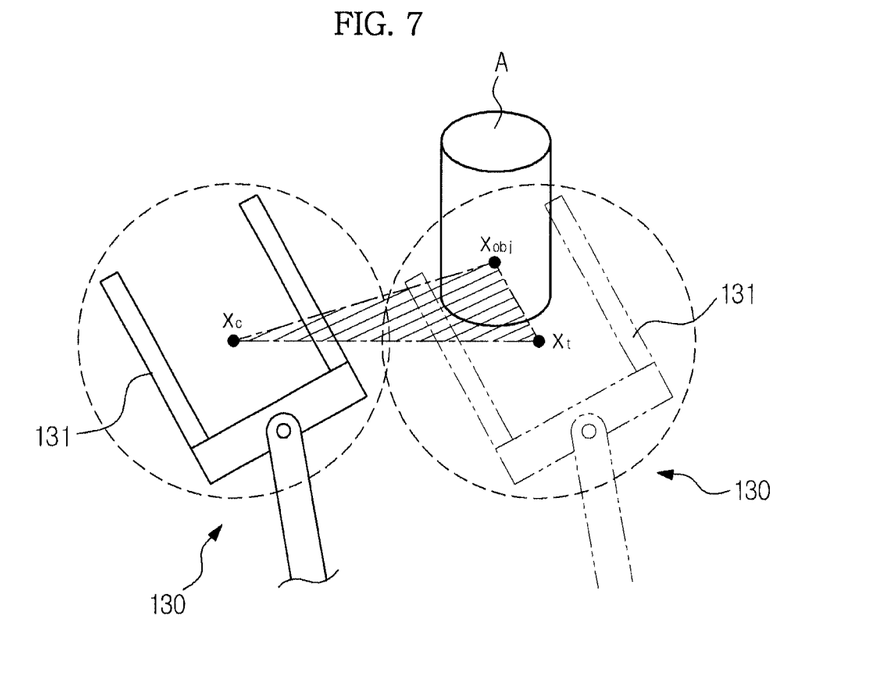
FIG. 7 is a view illustrating an arc-shaped path in a three-dimensional space along which the gripper in accordance with one embodiment moves to grip an object.

FIG. 5 is a view illustrating modeling of gripping of an object through the gripper in accordance with one embodiment, FIG. 6 is a view illustrating an arc-shaped path in a two-dimensional plane along which the gripper in accordance with one embodiment moves to grip an object, and FIG. 7 is a view illustrating an arc-shaped path in a three-dimensional space along which the gripper in accordance with one embodiment moves to grip an object.

FIG. 5 illustrates modeling of the target object A and the gripper 131 provided at the front end of the manipulator 130 into a spherical shape, on the assumption that the manipulator 130 grips the target object A.

In FIG. 5, the recognition unit 220 may recognize the position of the target object A, the current position of the gripper 131 and the target position of the gripper 131 as below.

First, the recognition unit 220 may model the target object A to be gripped into a spherical shape, recognize a central position $X_{obj}$ of the modeled spherical target object A as the position of the target object A, and transmit the position $X_{obj}$ of the target object A to the path generation unit 210.

Further, the recognition unit 220 may model the shape of the gripper 131 before the manipulator 131 grips the target object A into a spherical shape, recognize a central position of the modeled spherical gripper 131, i.e., a position $X_c$ of a start point before the gripper 131 executes an operation to grip the target object A, as the current position of the gripper 131, and transmit the current position $X_c$ of the gripper 131 to the path generation unit 210.

Moreover, the recognition unit 220 may model the shape of the gripper 131 when the manipulator 131 grips the target object A into a spherical shape, recognize a central position of the modeled spherical gripper 131, i.e., a position $X_t$ of a target point when the gripper 131 executes the operation to grip the target object A, as the target position of the gripper 131, and transmit the target position $X_t$ of the gripper 131 to the path generation unit 210.

Therefore, the two-dimensional path calculation unit 211 of the path generation unit 210 may calculate an included angle of a triangle formed by connecting the position $X_{obj}$ of the target object A, the current position $X_c$ of the gripper 131 and the target position $X_t$ of the gripper 131 transmitted from the recognition unit 220, i.e., a rotary angle Ø in a plane, and may calculate an arc-shaped path in a two-dimensional plane along which the gripper 131 needs to move using the calculated rotary angle Ø. Hereinafter, a method of calculating the arc-shaped path in the two-dimensional plane along which the gripper 131 needs to move will be described.

On the assumption that a time taken for the gripper 131 to move from the current position $X_c$ of the gripper 131 before the gripper 131 grips the target object A to the target position $X_t$ of the gripper 131 when the gripper 131 grips the target object A is referred to as 'T', an arc in a two-dimensional plane may be calculated by multiplying the sum R1+R2 of a radius R1 of the modeled spherical object A and a radius R2 of the modeled spherical gripper 131 by the rotary angle Ø by which the gripper 131 moves for a designated time t (0<t<T, a path movement time for which the gripper 131 may move without collision with the object A). Here, x and y coordinates in the two-dimensional plane to which the gripper 131 moves for the designated time t may be calculated by Equation 1 below.

$R(t)=(R1+R2)\phi(t)$ $x(t)=R(t)\cos(\phi(t))$ $y(t)=R(t)\sin(\phi(t))$ 　　　　　　　　Equation 1

In Equation 1, R(t) represents an arc in the two-dimensional plane along which the gripper 131 moves for the designated time t, and x(t) and y(t) represent x and y coordinates in the two-dimensional plane to which the gripper 131 moves for the designated time t.

As described above, when the two-dimensional path calculation unit 211 of the path generation unit 210 calculates the arc-shaped path in the two-dimensional plane along which the gripper 131 needs to move by calculating the rotary angle Ø in the plane consisting of the position $X_{obj}$ of the target object A, the current position $X_c$ of the gripper 131 and the target position $X_t$ of the gripper 131, the three-dimensional path transform unit 212 of the path generation unit 210 may generate a path in a three-dimensional space along which the gripper 131 needs to actually move using the calculated arc-shaped path in the two-dimensional plane. Hereinafter, a method of calculating the path in the three-dimensional space along which the gripper 131 needs to actually move will be described.

First, the three-dimensional path transform unit 212 of the path generation unit 210 may calculate a triangular plane using a three-dimensional matrix generating an arc-shaped path in the three-dimensional space, as shown in FIG. 7, from the position $X_{obj}$ of the target object A, the current position $X_c$ of the gripper 131 and the target position $X_t$ of the gripper 131 using Equation 2 below.

$$n=(x_c-x_{obj})/\|x_c-x_{obj}\|$$

$$a=(x_c-x_{obj})\times(x_t-x_{obj})$$

$$o=a\times n$$

$$R=[n\,o\,a] \quad \text{Equation 2}$$

In Equation 2, n is an X axis value of the three-dimensional triangular plane, o is a Y axis value of the three-dimensional triangular plane, and a is a z axis value of the three-dimensional triangular plane.

The path in three-dimensional space along which the gripper 131 needs to move may be generated by multiplying the three-dimensional matrix R calculated by Equation 2 by the x and y coordinates in the two-dimensional plane calculated by Equation 1, as stated in Equation 3 below.

$$\begin{bmatrix} x' \\ y' \\ z' \end{bmatrix} = R \begin{bmatrix} x \\ y \\ 0 \end{bmatrix} + \begin{bmatrix} x_{obj} \\ y_{obj} \\ z_{obj} \end{bmatrix} \quad \text{Equation 3}$$

In Equation 3, R is a matrix of the three-dimensional triangular plane, $$\begin{bmatrix} x \\ y \\ 0 \end{bmatrix}$$

represents the x and y coordinates in the two-dimensional plane, $$\begin{bmatrix} x_{obj} \\ y_{obj} \\ z_{obj} \end{bmatrix}$$

represents the position $X_{obj}$ of the target object A, and $$\begin{bmatrix} x' \\ y' \\ z' \end{bmatrix}$$

represents a path $X_t'$ in the three-dimensional space along which the gripper 131 needs to move.

Figure 8:
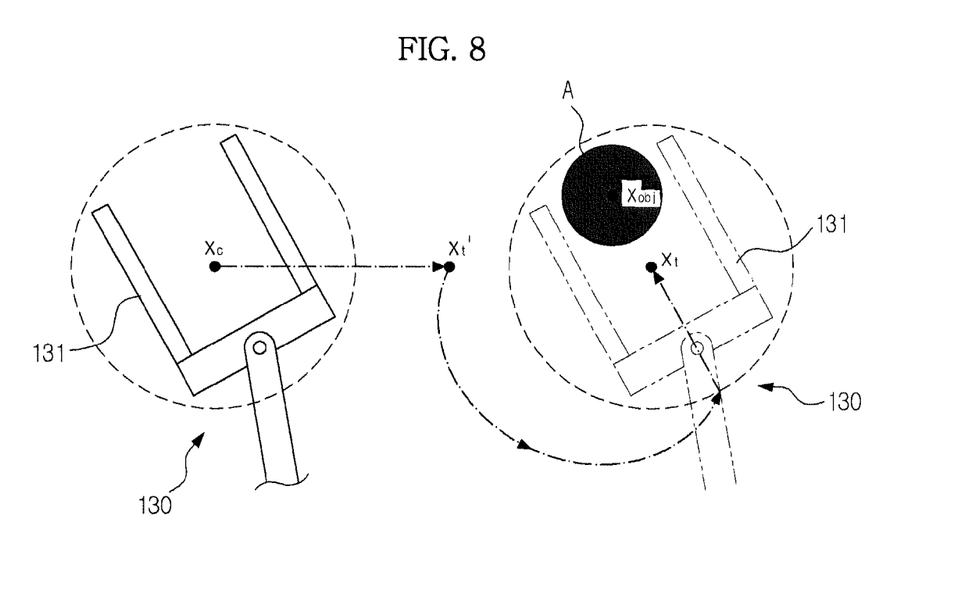
FIG. 8 is a view illustrating an actual path along which the gripper in accordance with one embodiment moves to grip an object.

FIG. 8 is a view illustrating an actual path along which the gripper in accordance with one embodiment moves to grip an object.

In FIG. 8, the gripper 131 may actually move along a path shown in an alternating long and short dash line from the current position $X_c$ of the gripper 131 before the gripper 131 grips the target object A and the target position $X_t$ of the gripper 131 when the gripper 131 grips the target object A.

Figure 9:
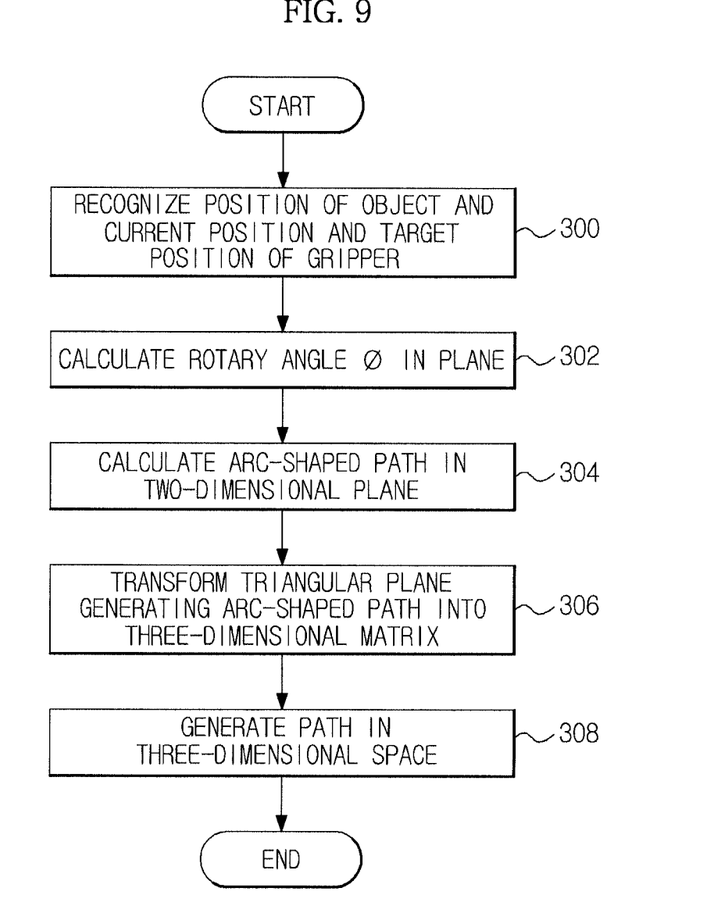
FIG. 9 is a flow chart illustrating a movement path generation method of the gripper of the manipulator of the robot in accordance with one embodiment.

FIG. 9 is a flow chart illustrating a movement path generation method of the gripper of the manipulator of the robot in accordance with one embodiment.

In FIG. 9, in order to enable the gripper 131 provided at the manipulator 130 to execute an operation to grip the target object A, the recognition unit 220 may recognize the position $X_{obj}$ of the target object A, the current position $X_c$ of the gripper 131 and the target position $X_t$ of the gripper 131, and may transmit these positions to the path generation unit 210 (Operation 300).

Then, the two-dimensional path calculation unit 211 of the path generation unit 210 may calculate an included angle of a triangle formed by connecting the position $X_{obj}$ of the target object A, the current position $X_c$ of the gripper 131 and the target position $X_t$ of the gripper 131 transmitted from the recognition unit 220, i.e., a rotary angle Ø in a plane, as shown in FIG. 5 (Operation 302).

Thereafter, the two-dimensional path calculation unit 211 of the path generation unit 210 may calculate an arc-shaped path in a two-dimensional plane along which the gripper 131 needs to move using the calculated rotary angle Ø in the plane, as shown in FIG. 6 (Operation 304).

The three-dimensional path transform unit 212 of the path generation unit 210 may transform a triangular plane generating an arc-shaped path in the three-dimensional space, as shown in FIG. 7, from the position $X_{obj}$ of the target object A, the current position $X_c$ of the gripper 131 and the target position $X_t$ of the gripper 131 transmitted from the recognition unit 220, into a three-dimensional matrix R (Operation 306).

Thereafter, the three-dimensional path transform unit 212 of the path generation unit 210 may generate an actual path in the three-dimensional space along which the gripper 131 needs to move, as shown in FIG. 8, by multiplying the three-dimensional matrix R by the x and y coordinates in the two-dimensional plane calculated by the two-dimensional path calculation unit 211.

As is apparent from the above description, in a manipulator and a path generation method thereof in accordance with one embodiment, a target object and a gripper may be modeled into a spherical shape, a current position of the gripper, a position of the target object and a target position of the gripper may be measured, an arc-shaped path in a two-dimensional plane along which the gripper needs to move may be calculated by calculating an included angle of a triangle consisting of the current position of the gripper, the position of the object and the target position of the gripper, the arc-shaped path in the two-dimensional plane may be transformed into an arc-shaped path in a three-dimensional space using a transform matrix consisting of the current position of the gripper, the position of the object and the target position of the gripper, thereby possibly automatically generating the shortest path of the manipulator to grip the object without collision with the object. Thus, a safe operation path may be achieved and an operation time may be reduced.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the image processing apparatus described herein.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A movement path generation method of a manipulator to grip an object comprising:
   recognizing a current position of a gripper provided at the front end of the manipulator, a position of the object and a target position of the gripper;
   calculating, by a processor, a rotary angle on a plane defined by the current position of the gripper, the position of the object and the target position of the gripper;
   calculating an arc-shaped path in a two-dimensional plane along which the gripper needs to move using the calculated rotary angle;
   calculating a transform matrix consisting of the current position of the gripper, the position of the object and the target position of the gripper; and
   transforming the arc-shaped path in the two-dimensional plane into an arc-shaped path in a three-dimensional space using the transform matrix.

2. The movement path generation method according to claim 1, wherein the current position of the gripper is a position of a start point of the gripper prior to executing an operation of gripping the object.

3. The movement path generation method according to claim 1, wherein the position of the object is a central position of the object to be gripped.

4. The movement path generation method according to claim 1, wherein the target position of the gripper is a position of a target point of the gripper to grip the object.

5. The movement path generation method according to claim 1, wherein the calculation of the rotary angle in the plane includes calculating an included angle of a triangle formed by connecting the current position of the gripper, the position of the object and the target position of the gripper.

6. The movement path generation method according to claim 5, wherein the calculation of the arc-shaped path in the two-dimensional space includes:
   calculating the sum of a radius of the object and a radius of the gripper;
   calculating an included angle by which the gripper moves for a designated time; and
   calculating x and y coordinates in the two-dimensional plane to generate an arc-shaped trajectory by multiplying the sum of the radius of the object and the radius of the gripper by the included angle by which the gripper moves for the designated time.

7. The movement path generation method according to claim 6, wherein the calculation of the transform matrix includes transforming a triangular plane generating the arc-shaped trajectory from the current position of the gripper, the position of the object and the target position of the gripper into a three-dimensional matrix.

8. The movement path generation method according to claim 7, wherein the transformation of the arc-shaped path in the two-dimensional plane into the arc-shaped path in the three-dimensional space includes generating the arc-shaped path in the three-dimensional space along which the gripper needs to move by multiplying the three-dimensional matrix by the x and y coordinates in the two-dimensional plane.

9. A manipulator comprising:
   a gripper to grip an object;
   a plurality of links to move the gripper to a target position to grip the object;
   a recognition unit to recognize a current position of the gripper, a position of the object and a target position of the gripper; and
   a path generation unit to calculate a rotary angle on a plane defined by the current position of the gripper, the position of the object and the target position of the gripper, and to calculate an arc-shaped path in a two-dimensional plane along which the gripper needs to move using the calculated rotary angle, the current position of the gripper, the position of the object and the target position of the gripper, and to generate an arc-shaped path in a three-dimensional space along which the gripper needs to move using the calculated arc-shaped path in the two-dimensional plane.

10. The manipulator according to claim 9, wherein the current position of the gripper is a position of a start point of the gripper prior to executing an operation of gripping the object.

11. The manipulator according to claim 9, wherein the position of the object is a central position of the object to be gripped.

12. The manipulator according to claim 9, wherein the target position of the gripper is a position of a target point of the gripper to grip the object.

13. The manipulator according to claim 9, wherein the path generation unit includes a two-dimensional path calculation unit to calculate the arc-shaped path in the two-dimensional plane using the current position of the gripper, the position of the object and the target position of the gripper, and a three-dimensional path transform unit to transform the arc-shaped path in the two-dimensional plane into the arc-shaped path in the three-dimensional space by calculating a transform matrix consisting of the current position of the gripper, the position of the object and the target position of the gripper.

14. The manipulator according to claim 13, wherein the two-dimensional path calculation unit calculates the rotary angle, and calculates the arc-shaped path in the two-dimensional plane along which the gripper needs to move using the calculated rotary angle.

15. The manipulator according to claim 14, wherein the rotary angle in the plane is an included angle of a triangle formed by connecting the current position of the gripper, the position of the object and the target position of the gripper.

16. The manipulator according to claim 15, wherein the two-dimensional path calculation unit calculates the sum of a radius of the object and a radius of the gripper, calculates an included angle by which the gripper moves for a designated time, and calculates x and y coordinates in the two-dimensional plane to generate an arc-shaped trajectory by multiplying the sum of the radius of the object and the radius of the gripper by the included angle by which the gripper moves for the designated time.

17. The manipulator according to claim 16, wherein the three-dimensional path transform unit transforms a triangular plane generating the arc-shaped trajectory from the current position of the gripper, the position of the object and the target position of the gripper into a three-dimensional matrix, and generates the arc-shaped path in the three-dimensional space along which the gripper needs to move by multiplying the three-dimensional matrix by the x and y coordinates in the two-dimensional plane.

18. The manipulator according to claim 9, further comprising joints to drive the plurality of links to move the gripper along the path generated by the path generation unit.

19. A movement path generation method of a manipulator to grip an object comprising:
  recognizing a position of a start point of a gripper provided at the front end of the manipulator, a central position of the object and a position of a target point of the gripper to grip the object;
  calculating, by a processor, a rotary angle on a plane defined by the start point of the gripper prior to executing an operation of gripping the object, the central position of the object and the target point of the gripper, wherein the calculation of the rotary angle in the plane includes calculating an included angle of a triangle formed by connecting the start point of the gripper, the central position of the object and the target point of the gripper;
  calculating an arc-shaped path in a two-dimensional plane along which the gripper needs to move using the calculated rotary angle;
  calculating a transform matrix consisting of the start point of the gripper, the central position of the object and the target point of the gripper; and
  transforming the arc-shaped path in the two-dimensional plane into an arc-shaped path in a three-dimensional space using the transform matrix.

20. The movement path generation method according to claim 5, wherein the calculation of the arc-shaped path in the two-dimensional space includes:
  calculating the sum of a radius of the object and a radius of the gripper;
  calculating an included angle by which the gripper moves for a designated time; and
  calculating x and y coordinates in the two-dimensional plane to generate an arc-shaped trajectory by multiplying the sum of the radius of the object and the radius of the gripper by the included angle by which the gripper moves for the designated time.

* * * * *